(12) United States Patent
Cho et al.

(10) Patent No.: US 9,491,612 B2
(45) Date of Patent: Nov. 8, 2016

(54) METHOD AND APPARATUS FOR CONTROLLING INTER-PLMN HANDOVER TO CSG CELL

(75) Inventors: Songyean Cho, Seoul (KR); Chaegwon Lim, Seoul (KR); Sangsoo Jeong, Suwon-si (KR); Sungho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 813 days.

(21) Appl. No.: 13/440,300

(22) Filed: Apr. 5, 2012

(65) Prior Publication Data

US 2012/0258766 A1 Oct. 11, 2012

(30) Foreign Application Priority Data

Apr. 5, 2011 (KR) .................. 10-2011-0031360

(51) Int. Cl.
*H04B 7/00* (2006.01)
*H04M 1/00* (2006.01)
*H04W 8/08* (2009.01)
(Continued)

(52) U.S. Cl.
CPC ............. *H04W 8/08* (2013.01); *H04W 36/14* (2013.01); *H04W 48/02* (2013.01)

(58) Field of Classification Search
CPC ........................ H04W 36/14; H04W 36/12
USPC ........................................ 455/550.1, 552.1
See application file for complete search history.

(56) References Cited

U.S. PATENT DOCUMENTS

| 8,265,033 | B2 * | 9/2012 | Gunnarsson | ......... | H04J 11/0093 |
| | | | | | 370/331 |
| 8,477,724 | B2 * | 7/2013 | Bakker | ............. | H04W 36/0033 |
| | | | | | 370/331 |

(Continued)

FOREIGN PATENT DOCUMENTS

EP 2 648 457 A1 10/2013
JP 2010-537480 A 12/2010

(Continued)

OTHER PUBLICATIONS

Takehiro Nakamura, "LTE Rel-9 and LTE-Advanced in 3GPP", NTT Docomo Inc., Sep. 8, 2009, Hong Kong.

(Continued)

*Primary Examiner* — Tilahun B Gesesse
(74) *Attorney, Agent, or Firm* — Jefferson IP Law, LLP (57) ABSTRACT

A method and apparatus for controlling inter-PLMN handover based on CSG lists of equivalent PLMNs is provided. A method for receiving subscriber information of a terminal at a Mobility Management Entity (MME) includes transmitting an update location request message for the terminal to a Home Subscriber Server (HSS), and receiving an update location acknowledgement message with the subscriber information of the terminal from the HSS, wherein the update location request message comprises a list of equivalent Public Land Mobile Networks (PLMNs) among which the MME supports inter-PLMN handover of the terminal. The method and apparatus for controlling inter-plan handover to a CSG cell according to the present invention is characterized in that a control apparatus of a core network acquires the allowed CSG lists for determining a User Equipments (UEs) capability of access to a CSG cell and determines whether to permit inter-PLMN handover based on the allowed CSG lists.

24 Claims, 11 Drawing Sheets

(51) Int. Cl.
   *H04W 36/14* (2009.01)
   *H04W 48/02* (2009.01)

(56) References Cited

U.S. PATENT DOCUMENTS

| | | | |
|---|---|---|---|
| 8,724,509 B2* | 5/2014 | Cheng et al. | 370/254 |
| 8,781,480 B2* | 7/2014 | Lim et al. | 455/444 |
| 8,804,682 B2* | 8/2014 | Hirano et al. | 370/338 |
| 8,862,099 B2* | 10/2014 | Rune | 455/411 |
| 8,937,924 B2* | 1/2015 | Choi et al. | 370/331 |
| 8,938,242 B2 | 1/2015 | Magadi Rangaiah et al. | |
| 2009/0047960 A1* | 2/2009 | Gunnarsson | H04J 11/0093 455/436 |
| 2009/0305699 A1* | 12/2009 | Deshpande | H04W 48/16 455/434 |
| 2010/0210288 A1* | 8/2010 | Kim | H04W 68/02 455/458 |
| 2010/0297979 A1 | 11/2010 | Watfa et al. | |
| 2011/0170517 A1* | 7/2011 | Bakker | H04W 36/0033 370/331 |
| 2011/0171915 A1* | 7/2011 | Gomes et al. | 455/73 |
| 2011/0223887 A1 | 9/2011 | Rune et al. | |
| 2011/0237250 A1 | 9/2011 | Horn et al. | |
| 2012/0076121 A1* | 3/2012 | Choi | H04W 76/062 370/338 |
| 2012/0088505 A1* | 4/2012 | Toh et al. | 455/434 |
| 2012/0207129 A1* | 8/2012 | Sun | 370/331 |
| 2012/0246325 A1* | 9/2012 | Pancorbo Marcos | H04L 12/2602 709/227 |
| 2012/0258766 A1* | 10/2012 | Cho | H04W 8/08 455/525 |
| 2013/0273887 A1* | 10/2013 | Hole | H04W 36/08 455/411 |
| 2013/0308527 A1* | 11/2013 | Chin | H04W 36/0022 370/328 |
| 2014/0010203 A1 | 1/2014 | Zhang et al. | |
| 2014/0016614 A1* | 1/2014 | Velev | H04W 4/005 370/331 |
| 2014/0035593 A1* | 2/2014 | Kim | H04W 4/08 455/432.3 |
| 2014/0162654 A1 | 6/2014 | Sander et al. | |

FOREIGN PATENT DOCUMENTS

| | | |
|---|---|---|
| JP | 2012-516105 A | 7/2012 |
| JP | 2013-544477 A | 12/2013 |
| WO | 2010/059122 A2 | 5/2010 |
| WO | 2010/151805 A1 | 12/2010 |
| WO | 2012/072714 A1 | 6/2012 |

OTHER PUBLICATIONS

Motorola, "Clarification for inter-PLMN Handover", 3GPP TSG SA WG2 Meeting #77, Jan. 18-22, 2010, Shenzhen, China, S2-100931.
Samsung, Equivalent PLMN in relation to CSG-Id's, 3GPP TSG-RAN2#73 meeting, R2-111218, Feb. 14, 2011, step2; p. 3; figure 3, point 2; p. 4, paragraph 3, Taipei, Taiwan.
Samsung, Equivalent PLMN in relation to CSG-Id's, 3GPP TSG SA WG2 Meeting #83, S2-110463, Feb. 15, 2011, point B, "Impact:"; p. 3, line 3-line 4, Salt Lake City, U.S.A.
Samsung, Equivaluent PLMN in Relation to CSG-Id's, 3GPP TSG-RAN2#73 Meeting, Taipei, Taiwan, Feb. 21-25, 2011, pp. 1-4, R2-111218.

* cited by examiner

FIG. 11 ated art.

METHOD AND APPARATUS FOR CONTROLLING INTER-PLMN HANDOVER TO CSG CELL

PRIORITY

This application claims the benefit under 35 U.S.C. §119 (a) of a Korean patent application filed on Apr. 5, 2011 in the Korean Intellectual Property Office and assigned Serial No. 10-2011-0031360, the entire disclosure of which is hereby incorporated by reference.

BACKGROUND OF THE INVENTION

1. Field of the Invention

The present invention relates to a method and apparatus for controlling inter-Public Land Mobile Network (PLMN) handover to a Closed Subscriber Group (CSG) cell. More particularly, the present invention relates to a method and apparatus for controlling inter-PLMN handover based on CSG lists of equivalent PLMNs.

2. Description of the Related Art

A Closed Subscriber Group (CSG) is a limited set of users permitted to access a specific cell (i.e., a CSG cell assigned a CSG ID). In other words, only those users included in the CSG list are permitted to access the specific cell. For example, when a femtocell is deployed for use in a specific location, such as a user's home, it can be configured in CSG mode in which it is assigned a CSG ID. In that case, the CSG ID is added to the allowed CSG list of the family members' terminals so as to allow access to the femto cell.

Figure 1:
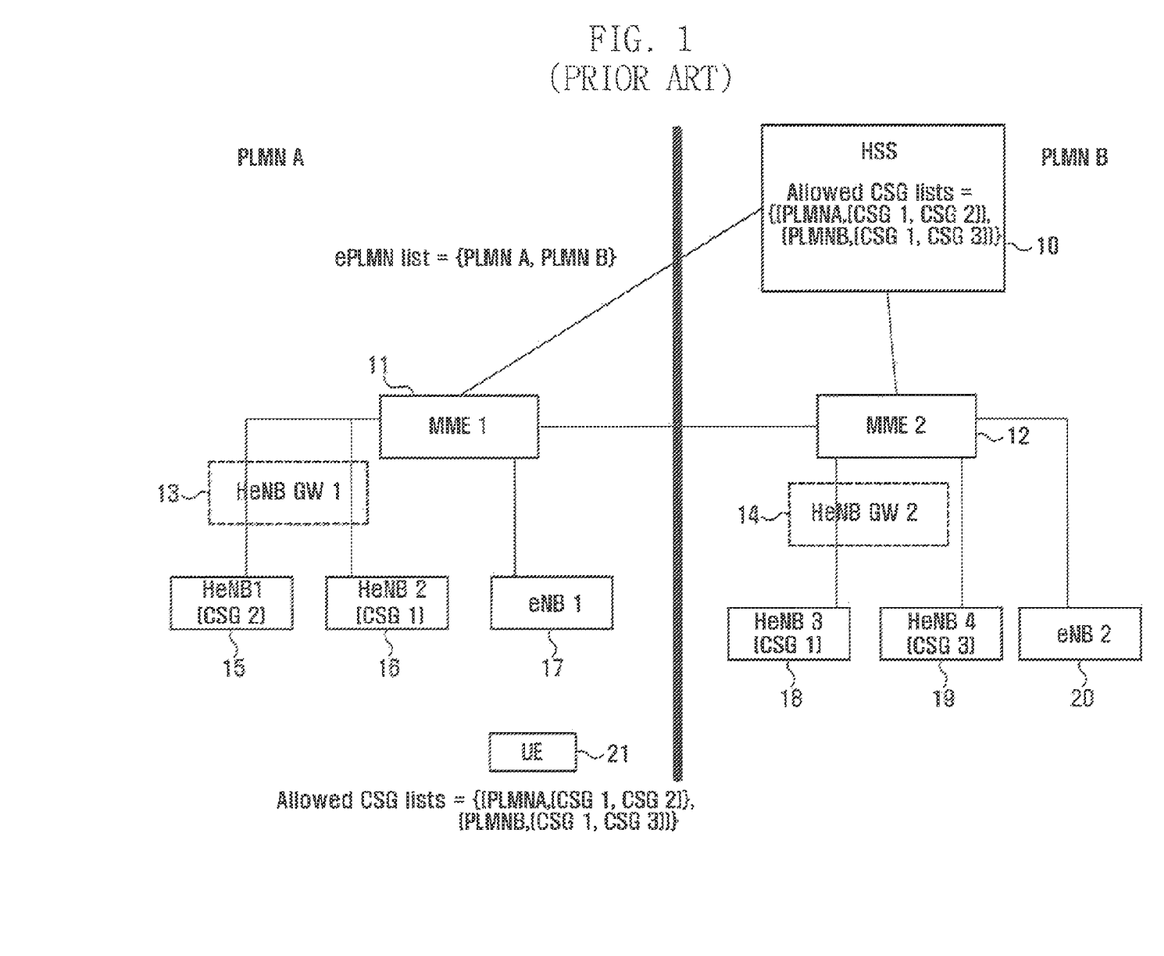
FIG. 1 is a diagram illustrating a configuration of network control nodes including a Home evolved Node B (HeNB) having a Closed Subscriber Group Identifier (CSG ID) according to the related art.
Figure 3:
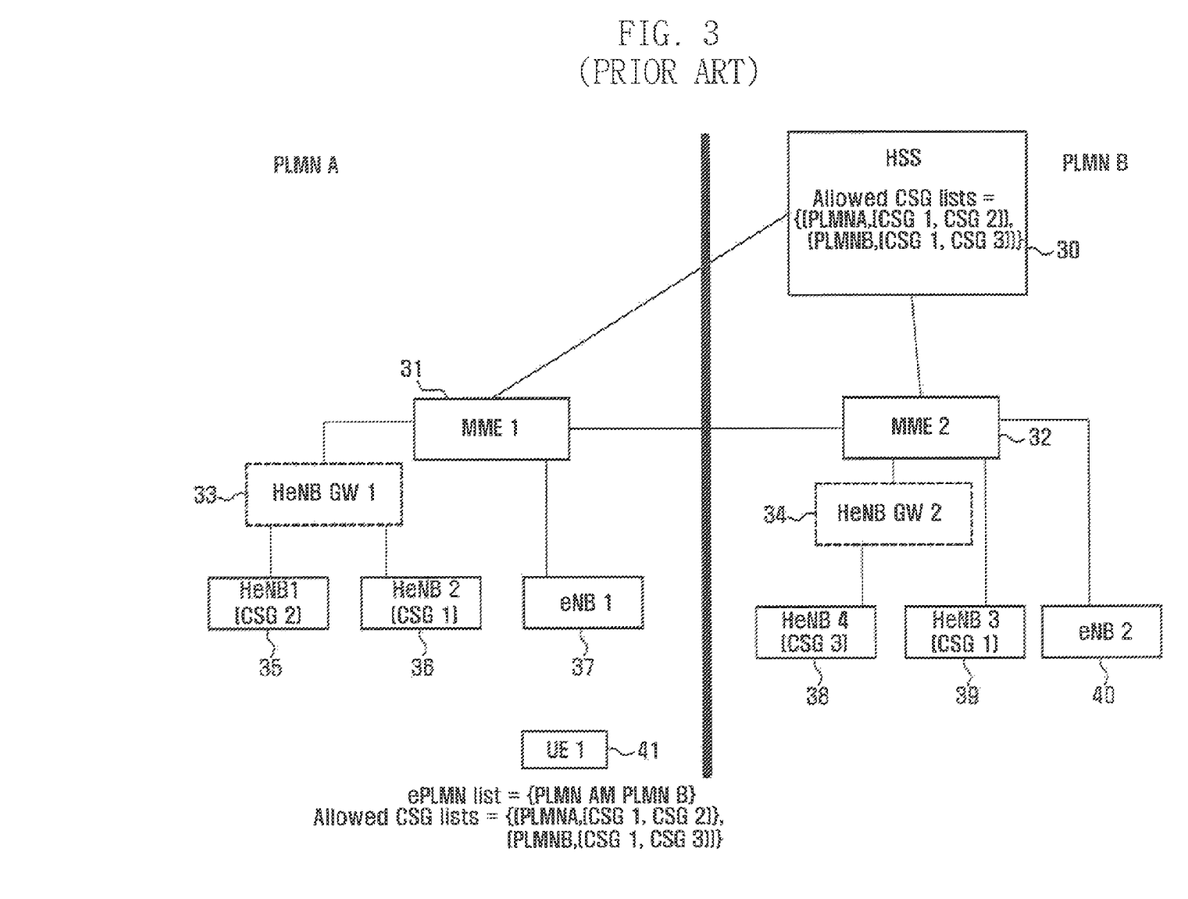
FIG. 3 is a diagram illustrating another configuration of network control nodes having a CSG ID according to the related.

The control nodes of a network including a Home evolved Node B (HeNB) that are assigned a CSG ID can be configured as shown in FIGS. 1 and 3.

FIG. 1 is a diagram illustrating a configuration of network control nodes including an HeNB having a CSG ID according to the related art. FIG. 3 is a diagram illustrating another configuration of network control nodes having a CSG ID according to the related art.

Referring to FIG. 1, macro eNB1 17 and macro eNB2 20 having no CSG ID and HeNBs 15, 16, 18, and 19 having a CSG ID are respectively connected to a Mobility Management Entity (MME) 11 and 12, which are in turn each connected to Home Subscriber Server (HSS) 10. The connection to the MME can be achieved via an HeNB Gateway (GW) 13 and 14, as used by the HeNBs 15, 16, and 18, or without involvement of an HeNB GW as in the case of the HeNB 19. Because the fact of whether the HeNB is connected to the MME through the HeNB GW does not influence the procedure related to the present invention, a detailed description thereof is omitted Similarly, referring to FIG. 3, both macro eNBs 37 and 40 having no CSG ID and HeNBs 35, 36, 38 and 39 having a CSG ID are connected to an MME 31 and 32, respectively, which are in turn each connected to HSS 30. The connection to an MME can be achieved via an HeNB GW 33 and 34, as used by the HeNBs 35, 36, and 38, or without involvement of an HeNB GW as in the case of the HeNB 39. Because the fact of whether the HeNB is connected to the MME through the HeNB GW does not influence the procedure related to the present invention, a detailed description thereof is omitted.

Problems that may arise in the networks configured as shown in FIGS. 1 and 3 are described with reference to FIGS. 2 and 4, respectively.

Figure 2:
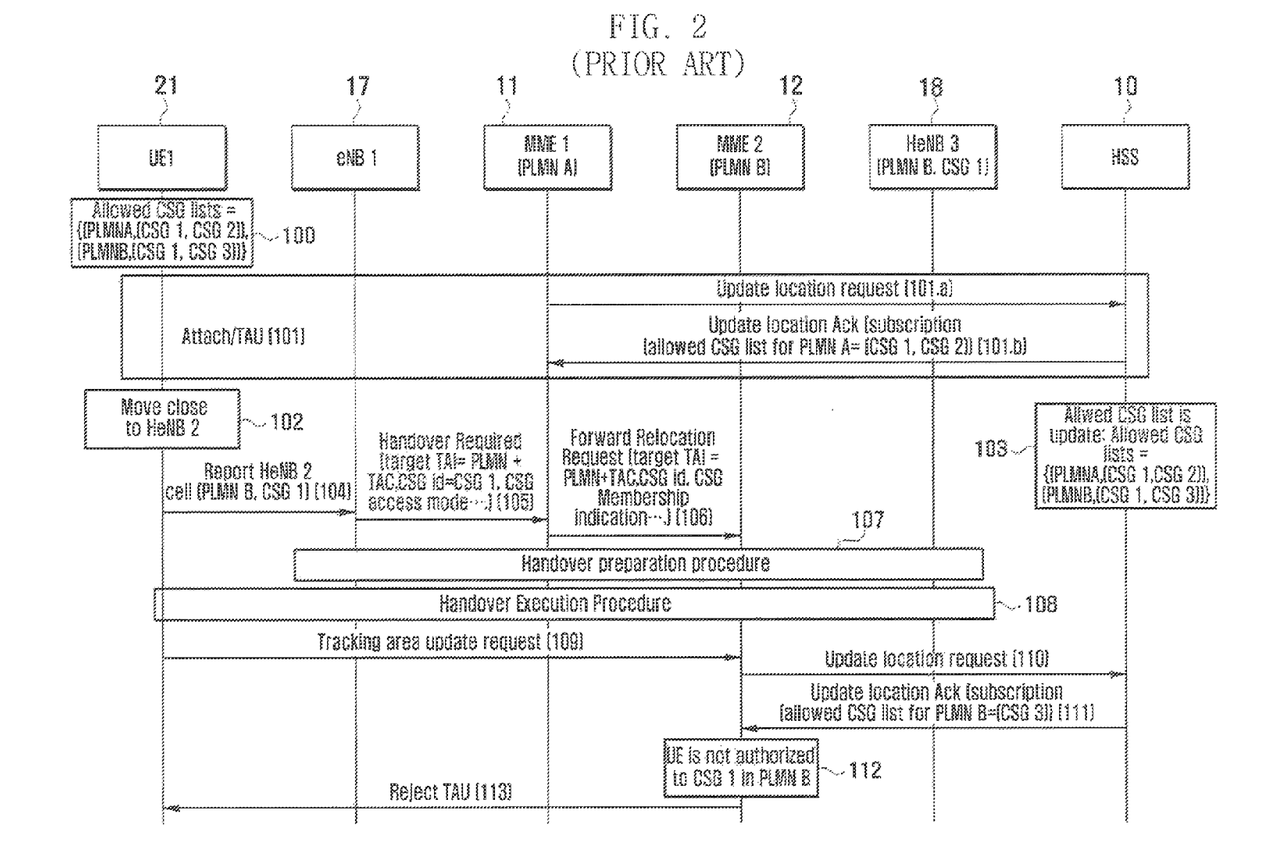
FIG. 2 is a signaling diagram illustrating a handover procedure in the network of FIG. 1 according to the related art.

FIG. 2 is a signaling diagram illustrating a handover procedure in the network configured as shown in FIG. 1 according to the related art.

Referring to FIG. 2, User Equipment (UE) 21 is configured with the allowed CSG lists of {(PLMN A, (CSG1, CSG2)), (PLMN B, (CSG1, CSG3))} at step 100 which is the same CSG list of the HSS 10. Here, PLMN A and PLMN B are equivalent PLMNs. In this state, if the UE 21 sends an ATTACH or a TRACKING AREA UPDATE (TAU) request to the MME1 11 of the PLMN A at step 101, the MME1 11 processes the ATTACH or the TAU request and sends a Location Update Request to the HSS 10 so as to register itself as the serving MME of the corresponding UE 21 and acquire the subscription information of the UE 21 at step 101.a. The subscription information includes the CSG list of the PLMN A as the registered PLMN and is delivered to the MME1 11 at step 101.b. After the registration process has completed, the CSG list of the PLMN B is updated. In this case, the CSG1 may be unintentionally deleted in the CSG list at step 103. Such a CSG list update situation of the HSS 10 is delivered through Open Mobile Alliance (OMA) Device Management (DM). However, since the allowed CSG list update execution timing in the UE 21 using the OMA-DM is not synchronized with the HSS 10 update timing accurately, the allowed CSG list of the UE 21 is in the un-synchronized state for a certain time period until the OMA-MD is executed, even though the allowed CSG list of the HSS 10 has been updated. In such a situation, the UE 21 may approach the HeNB3 18 at step 102. If the UE 21 moves towards the HeNB3 18 in the state that in which its allowed CSG list is un-synchronized, the measurement report is performed based on the old allowed CSG list which has not been updated yet. That is, the UE 21 determines whether the CSG ID of the HeNB3 18 exists in the PLMN's allowed CSG list stored in the UE 21. Since the CSG ID of the HeNB3 18 is CSG1 and the PLMN B's CSG list of the UE 21 includes the CSG1, the determination result is true such that the UE 21 reports the CSG1 cell (i.e., the HeNB3's cell) to the eNB1 17 as the current serving cell at step 104. If the report is received, the eNB1 17 evaluates the information on the equivalent PLMN and the CSG membership reported by the UE 21 to determine inter-PLMN handover to the target CSG cell of a different PLMN, resulting in a handover decision for the UE 21 to the CSG1 of the PLMN B and sending a Handover Required message to the MME1 11 (PLMN A) at step 105. If the Handover Required message is received, the MME1 11 determines handover based on the allowed CSG list of the PLMN A which is received from the HSS 10 at step 101.b other than the allowed CSG list of the target PLMN B. Since the CSG1 as the CSG ID of the target cell exists in the allowed CSG list of the PLMN A, the MME1 11 determines that the UE 21 has access rights to the CSG1 and, as a consequence, determines that the PLMN B is the equivalent PLMN of the PLMN A. In that case, the MME1 11 executes the handover by sending a forward relocation required message to the MME2 12 as the target MME at step 106. Since the MME2 12, as the target MME, is the equivalent PLMN of the source PLMN, it performs the handover preparation procedure at step 107 and the handover execution procedure entirely such that the UE 21 completes the handover to the HeNB3 18 at step 108. Since the TA is changed due to the change of the PLMN after the completion of the handover, the UE 21 sends a TAU message to the MME2 12 as the new MME at step 109. If the TAU message is received, the MME2 12 sends a location update request to the HSS 10 at step 110 for the TAU to register the MME2 12 as the serving MME of the UE 21 and receives the subscription data including the PLMN B's allowed subscription list of CSG3 at step 111. At this time, the MME2 12 determines that the UE 21 is not authorized for CSG1 in step 112. That is, the received PLMN B's allowed CSG list does not include CSG1. Accordingly, the TAU request of the UE 21 is rejected at step 113 and the UE 21 enters the unregistered state. Thus, if the procedure depicted in FIG. 2 is executed in the network configured as shown in FIG. 1, a problem is caused in that the UE 21 completes the handover and then loses network connection.

Figure 4:
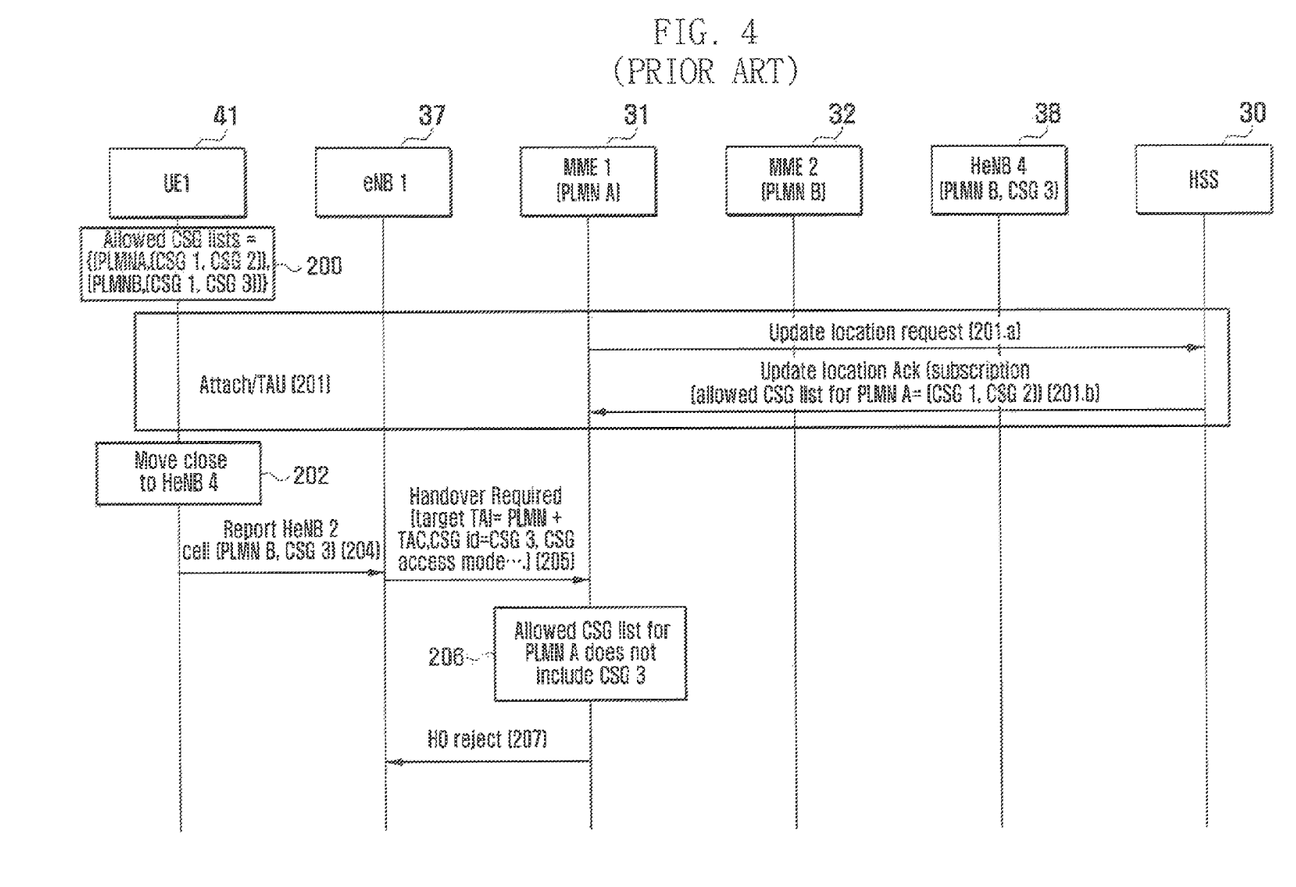
FIG. 4 is a signaling diagram illustrating a handover procedure in the network of FIG. 3 according to the related art.

FIG. 4 is a signaling diagram illustrating a handover procedure in the network configured as shown in FIG. 3.

Referring to FIG. 4, UE 41 is configured with the allowed CSG lists of {(PLMN A, (CSG1, CSG2)), (PLMN B, (CSG2, CSG3))} in step 200 which is the same CSG list of the HSS 30. Here, PLMN A and PLMN B are equivalent PLMNs. In this state, if the UE 41 sends an ATTACH or a TAU request to the MME1 31 of the PLMN A at step 201, the MME1 31 processes the ATTACH or TAU request and sends a Location Update Request to the HSS 30 at step 201.*a* so as to register itself as the serving MME of the corresponding UE 41 and acquire the subscription information of the UE 41 at step 201.*b*. The subscription information includes the CSG list of the PLMN A as the registered PLMN and is delivered to the MME1 31. In this situation, the UE may approach the HeNB4 38 at step 202. In that case, the UE 41 performs a measurement report based on its allowed CSG list. That is, the UE 41 determines whether the CSG ID of the HeNB4 38 exists in the corresponding PLMN's allowed CSG list stored in the UE 41. Since the CSG ID of the HeNB4 38 is CSG3 and the CSG3 exists in the corresponding PLMN's CSG list of the UE 41, the determination result is true such that the UE 41 reports the CSG3 as a cell of the HeNB4 38 to the eNB1 37 as the current serving cell at step 204. If the report is received, the eNB1 37 makes an inter-PLMN handover decision to a CSG cell of another PLMN using the membership information and equivalent PLMN information reported by the UE 41 and sends a Handover Required message to the MME1 31 (PLMN A) at step 205. If the Handover Required message is received, the MME1 31 makes a handover decision at step 206 based on the allowed CSG list of the PLMN A which is received from the HSS 30 at step 201.*b* other than the allowed CSG list of the target PLMN B. If the CSG3 as the CSG ID of the target cell does not exist in the allowed CSG list of the PLMN A, it is determined that the UE 41 has no access right to the CSG3 such that the handover is rejected at step 207, even though the UE can actually make a handover to the CSG 3. As a result, although it is possible to be served by the HeNB4 38 having a good channel condition, the UE 41 is being served by the eNB1 37 having a poor channel condition.

That is, the procedure shown in FIG. 4 that is executed in the network configuration of FIG. 3 causes a problem in that the UE fails to perform a handover to the best cell available, resulting in a potential failure of the communication.

SUMMARY OF THE INVENTION

Aspects of the present invention are to address at least the above-mentioned problem and/or disadvantages and to provide at least the advantages described below. Accordingly, an aspect of the present invention is to provide an access control method and apparatus that is capable of preventing a handover decision from being made to an inappropriate network or the handover from being blocked.

In accordance with an aspect of the present invention, a method for receiving subscriber information of a terminal at a Mobility Management Entity (MME) is provided. The method includes transmitting an update location request message for the terminal to a Home Subscriber Server (HSS), and receiving an update location acknowledgement message with the subscriber information of the terminal from the HSS, wherein the update location request message comprises a list of equivalent Public Land Mobile Network (PLMNs) among which the MME supports inter-PLMN handover of the terminal.

In accordance with another aspect of the present invention, a method for transmitting subscriber information of a terminal at an HSS is provided. The method includes receiving an update location request message for the terminal from an MME, and transmitting an update location acknowledgement message including the subscriber information of the terminal to the MME, wherein the update location request message comprises a list of equivalent PLMNs among which the MME supports inter-PLMN handover of the terminal.

In accordance with another aspect of the present invention, an MME for receiving subscriber information of a terminal is provided. The MME includes a transceiver which communicates with at least one of a base station and an HSS, and a controller which controls transmitting an update location request message for the terminal to an HSS and receiving an update location acknowledgement message with the subscriber information of the terminal from the HSS, wherein the update location request message comprises a list of equivalent PLMNs among which the MME supports inter-PLMN handover of the terminal.

In accordance with still another aspect of the present invention, an HSS for transmitting subscriber information of a terminal is provided. The HHS includes a transceiver which communicates with an MME, and a controller which controls receiving an update location request message for the terminal from an MME and transmitting a update location acknowledgement message including the subscriber information of the terminal to the MME, wherein the update location request message comprises a list of equivalent PLMNs among which the MME supports inter-PLMN handover of the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

In the following description, the term "equivalent Public Land Mobile Networks (PLMNs)" refers to a PLMN belonging to a set of PLMNs among which a certain Mobility Management Entity (MME) supports handover of a certain User Equipment (UE). In the following description, the term "inter-PLMN handover" refers to a handover between two equivalent PLMNs.

It is to be understood that the singular forms "a," "an," and "the" include plural referents unless the context clearly dictates otherwise. Thus, for example, reference to "a component surface" includes reference to one or more of such surfaces.

Figure 5:
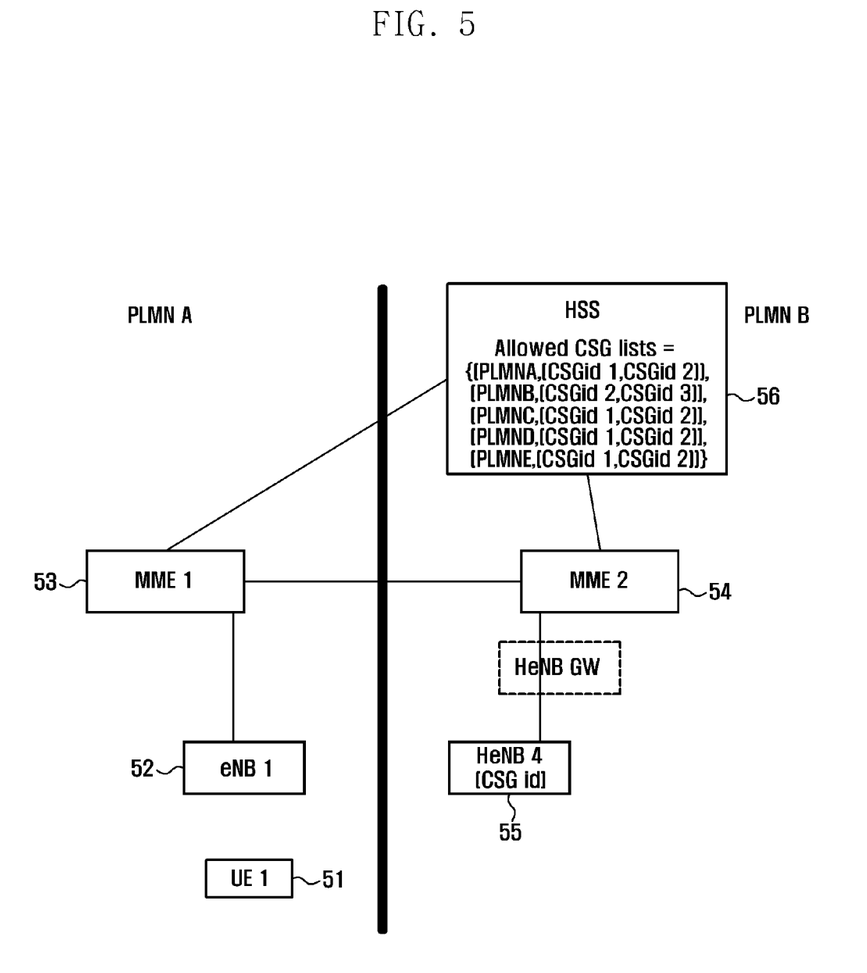
FIG. 5 is a diagram illustrating a configuration of a network according to an exemplary embodiment of the present invention.

FIG. 5 is a diagram illustrating a configuration of a network according to an exemplary embodiment of the present invention.

Referring to FIG. 5, the communication network includes a Home Subscriber Server (HSS) 56 having allowed Closed Subscriber Groups (CSGs) of {(PLMN A, (CSGID1, CSGID2)), (PLMN B, (CSGID2, CSGID3)), (PLMN C, (CSGID1, CSGID2)), (PLMN D, (CSGID1, CSGID2)), (PLMN E, (CSGID1, CSGID2))}. The communication network further includes MME1 53, and an evolved Node B1 (eNB1) 52 which may provide service to a UE 51. The communication network also includes MME2 54 and a Home evolved Node B (HeNB4) 55 that may provide service to the UE 51 if the UE 51 moves into the service coverage area of the HeNB4 55 or when the HeNB4 55 is otherwise selected. As illustrated in FIG. 5, the connection between the HeNB4 55 and the MME2 54 may include an HeNB GateWay (GW). However, as the HeNB GW is a connection that does not affect the following description, its connection is shown as a dotted line and is not further explained.

Figure 6:
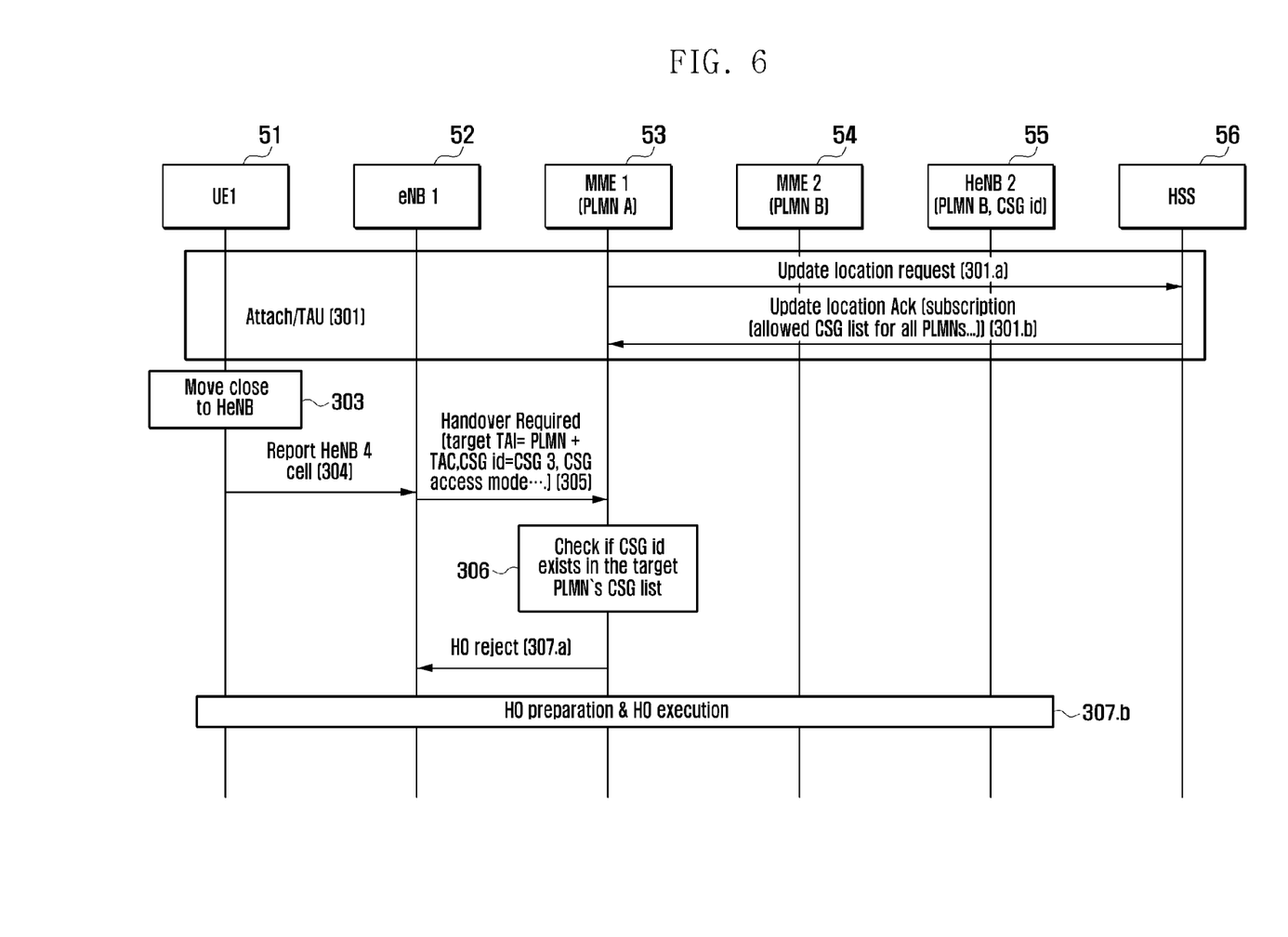
FIGS. 6 to 8 are signaling diagrams illustrating handover procedures according to exemplary embodiments of the present invention.
Figure 7:
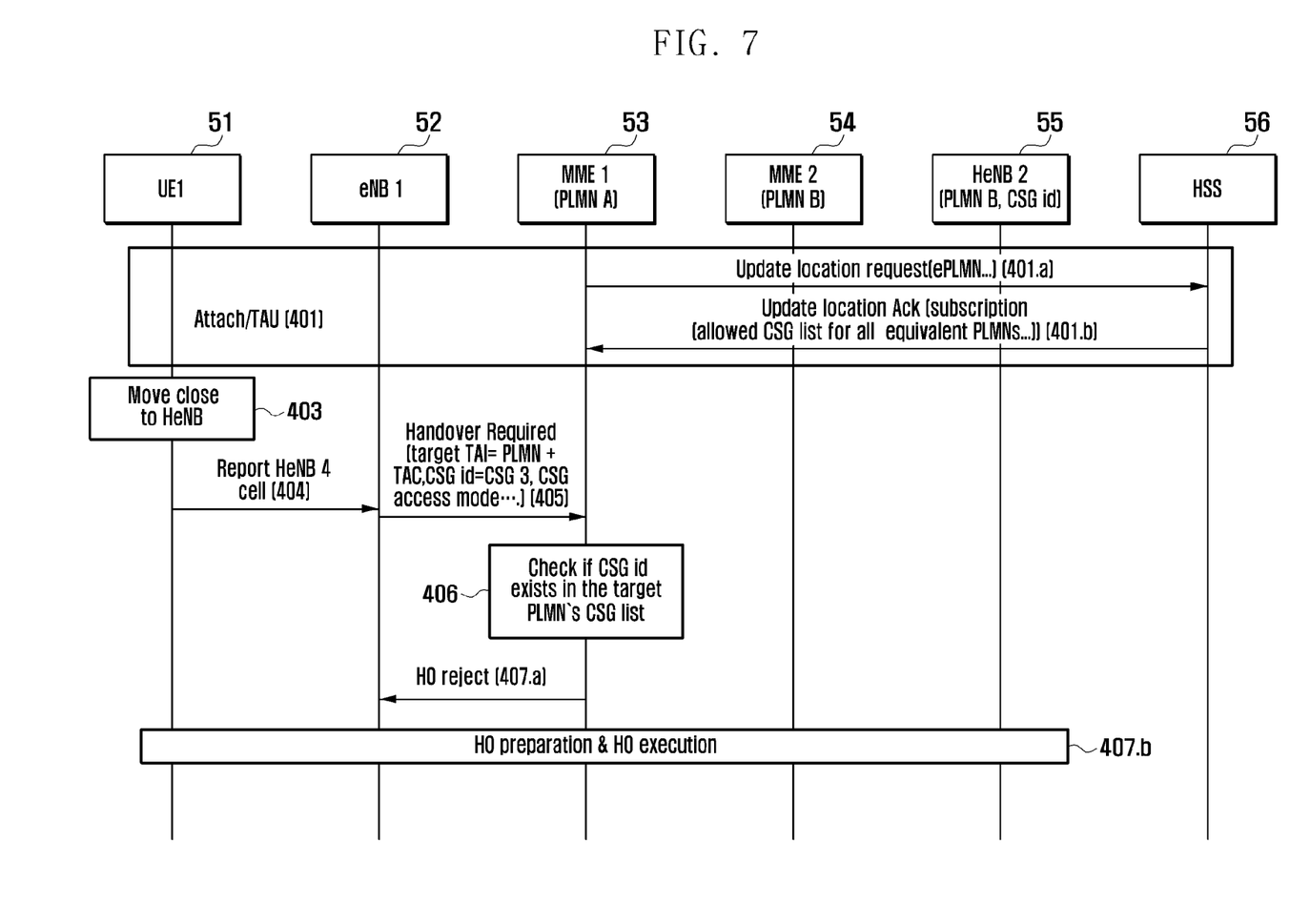
Figure 8:
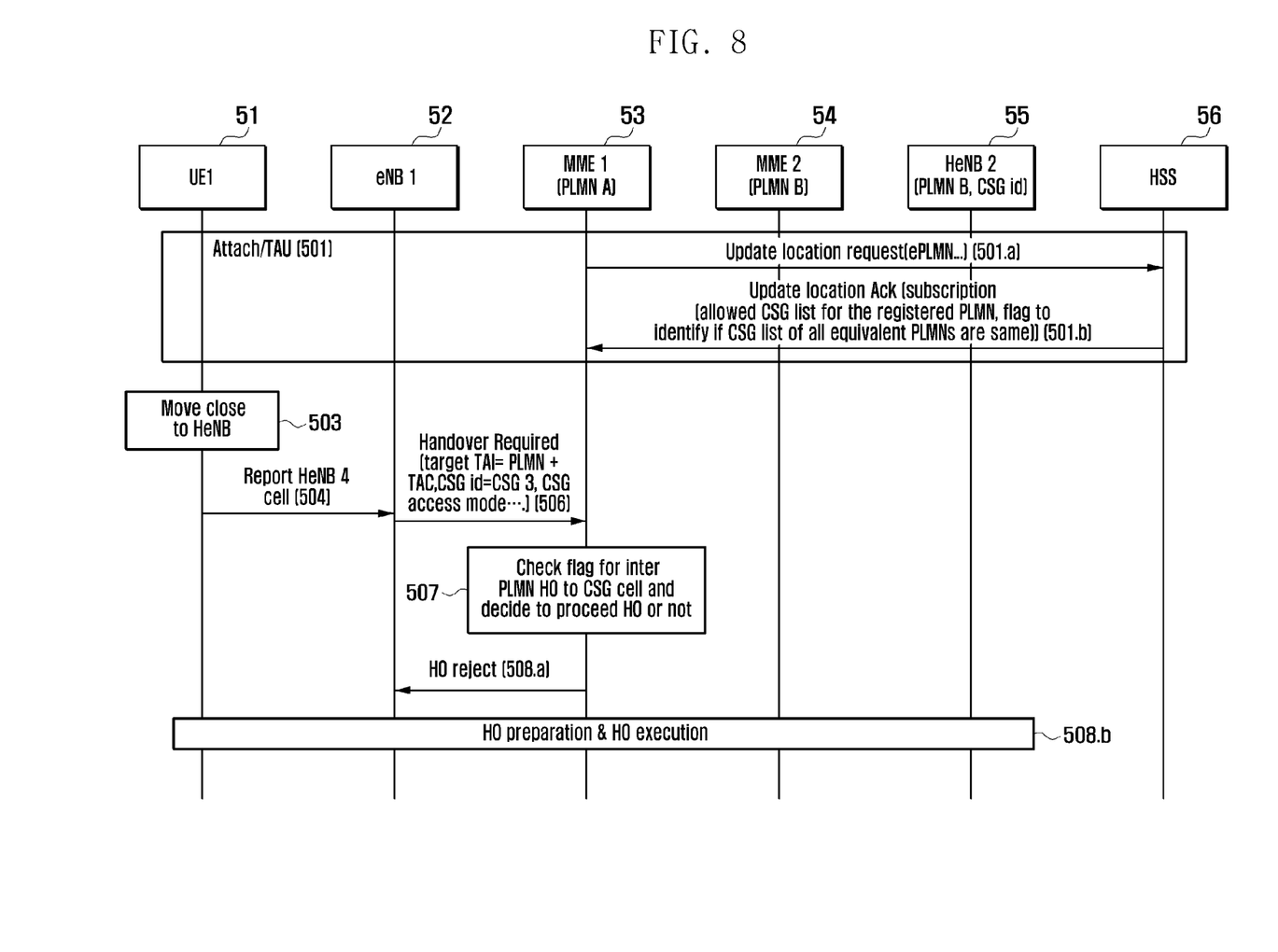

FIGS. 6 to 8 are signaling diagrams illustrating handover procedures according to exemplary embodiments of the present invention.

Referring to FIG. 6, when the UE1 51 is performing an Attach/Tracking Area Update (TAU) procedure, the HSS 56 transmits all CSG lists stored in the HSS 56. That is, in the Attach and TAU procedure of the UE 51 at step 301, if the MME1 53 sends an update location request message to the HSS 56 at step 301.a, the HSS 56 sends the allowed CSG lists of all PLMNs that are stored in the UE 51 subscription data to the MME1 53 at step 301.b. In such a situation, the UE 51 may approach the HeNB4 55 at step 303. In that case, the UE 51 reports the CSGID of the HeNB4 cell to the eNB1 52 as the current serving cell at step 304. After receiving the allowed CSG lists, if a handover required message is received from the eNB1 52 at step 305, the MME1 53 determines whether, among the allowed CSG lists, the list corresponding to the target PLMN includes the target CSG ID at step 306. If so, the MME1 53 performs a handover procedure to the MME2 54 and HeNB2 55 at step 307.b and, otherwise, rejects the handover at step 307.a.

In an alternative embodiment, the subscription data transmitted from the HSS to the MME may be reduced. In order to reduce the data amount, it can be considered to eliminate the transmission of the unnecessary allowed CSG lists. Since the inter-PLMN handover takes place between the equivalent PLMNs, the allowed CSG lists of the non-equivalent PLMNs are unnecessary information and thus it is more efficient for the HSS to transmit only the equivalent PLMNs' allowed CSG lists to the MME. This exemplary procedure is described with reference to FIG. 7.

Referring to FIG. 7, during the UE 51 Attach or TAU procedure at step 401, the MME1 53 sends an update location request message including parameters of equivalent PLMNs to the HSS 56 at step 401.a. If the equivalent PLMN list is received, the HSS 56 sends the allowed CSG lists of the equivalent PLMNs among all of the allowed CSG lists of the PLMNs that are stored in the UE 51 subscription data at step 401.b. Among the allowed CSG lists of {(PLMN A, (CSGID1, CSGID2)), (PLMN B, (CSGID2, CSGID3)), (PLMN C, (CSGID1, CSGID2)), (PLMN D, (CSGID1, CSGID2)), (PLMN E, (CSGID1, CSGID2))} retained in the HSS 56, the allowed CSG lists of the PLMN A and PLMN B as equivalent PLMNs, i.e., {(PLMN A, (CSGID1, CSGID2)), (PLMN B, (CSGID2, CSGID3))} are transmitted to the MME1 53. In such a situation, the UE 51 may approach the HeNB4 55 at step 403. In that case, the UE 51 reports the CSGID of the HeNB4 cell to the eNB1 52 as the current serving cell at step 404. After receipt of the allowed CSG lists of the equivalent PLMNs, if a handover required message is received from the eNB1 52 at step 405, the MME1 53 determines whether, among the allowed CSG lists received at step 401.*b*, the target PLMN's allowed CSG list includes the target CSG ID at step 406, and, if so, performs handover at step 407.*b*. Otherwise, the MME1 53 rejects the handover at step 407*a*.

Although the exemplary embodiment of FIG. 7 reduces the amount of subscription data transmitted from the HSS to the MME as compared to the exemplary embodiment of FIG. 6, there may be additional room for reducing the redundant data in transmitting the CSG lists of the equivalent PLMNs in identical configuration. In case that the same allowed CSG list is configured for the equivalent PLMNs, it can be considered to transmit only a flag. That is, when the allowed CSG lists of the equivalent PLMNs that allow inter-PLMN handover are configured identically among each other, the HSS can provide only the allowed CSG list of the registered PLMN and equivalent flag. If the allowed CSG list of the registered PLMN is received along with the flag, the MME makes the inter-PLMN handover decision and otherwise, without a flag, rejects the inter-PLMN handover. This procedure is described with reference to FIG. 8.

Referring to FIG. 8, when the UE1 51 is performing Attach/TAU procedure at step 501, the MME1 53 sends an update location request message to the HSS 56 with the parameters of equivalent PLMNs at step 501.*a*. If an equivalent PLMN list is received, the HSS 56 determines the allowed CSG lists of the equivalent PLMNs among all allowed CSG lists stored in the UE 51 subscription data and sends a flag indicating whether the allowed CSG list of the PLMN A as registered PLMN and the allowed CSG list of the equivalent PLMNs are identical with each other at step 501.*b*. After comparing the allowed CSG lists of the PLMN A and PLMN B as the equivalent PLMNs among the allowed CSG lists={(PLMN A, (CSGID1, CSGID2)), (PLMN B, (CSGID2, CSGID3)), (PLMN C, (CSGID1, CSGID2)), (PLMN D, (CSGID1, CSGID2)), (PLMN E, (CSGID1, CSGID2))} as shown in FIG. 5, the HSS 56 sends the flag indicating the result of comparison with the allowed CSG list of the PLMN A as the registered PLMN to the MME1 53. In such a situation, the UE 51 may approach the HeNB4 55 at step 503. In that case, the UE 51 reports the CSGID of the HeNB4 cell to the eNB1 52 as the current serving cell at step 504. After the receipt of the flag, if a handover required message is received from the eNB1 52 at step 506, the MME1 53 determines the information received form the HSS 56 at step 507. That is, when the handover is targeted to the CSG cell of another PLMN, if the flag is set to false, the handover is rejected at step 508.*a*. Otherwise, if the flag is set to true, the MME1 53 progresses with the handover only when the CSG ID of the target cell is in the allowed CSG list retained by the MME 53 at step 508.*b*.

Figure 9:
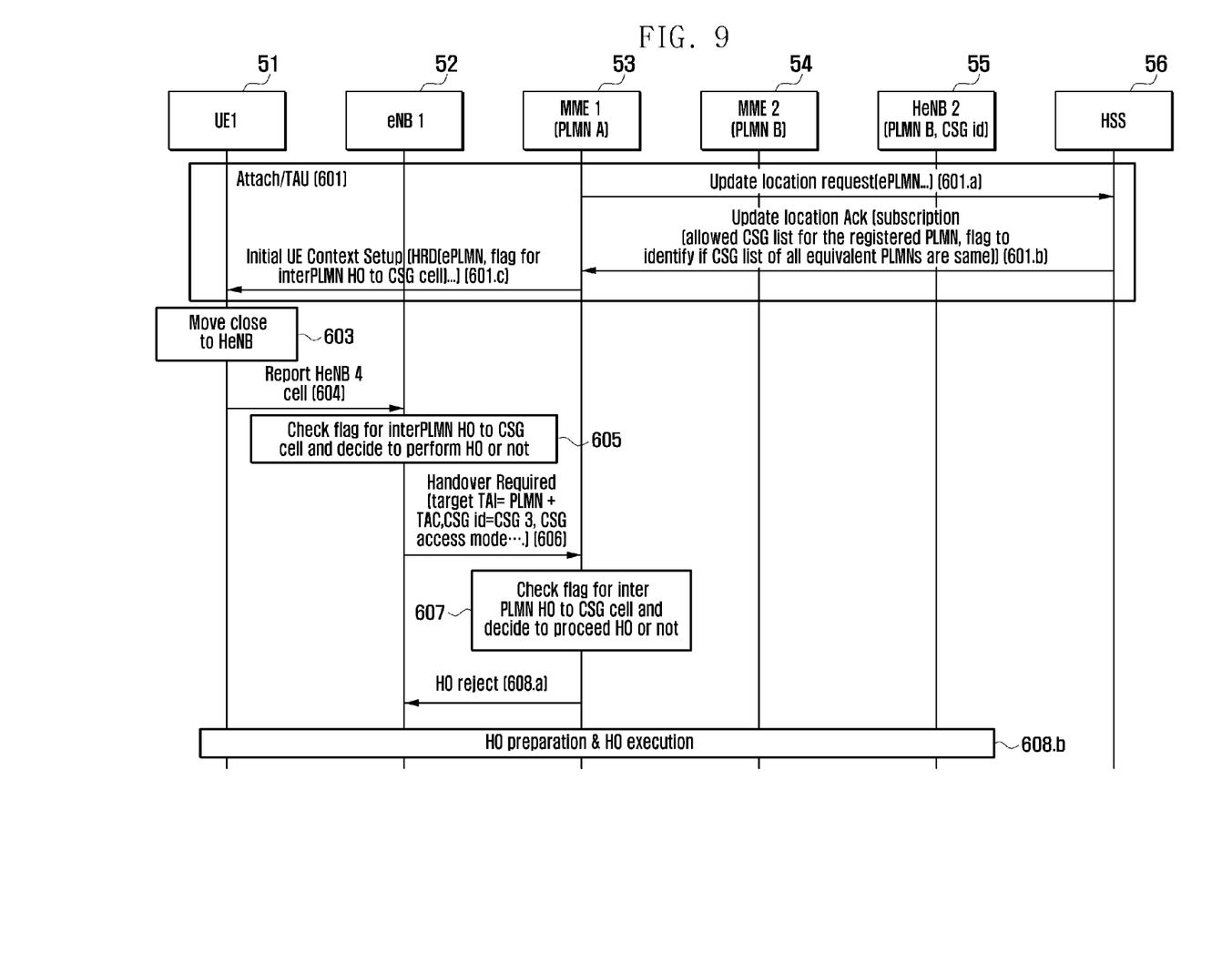
FIG. 9 is a signaling diagram illustrating a handover procedure modified from the handover procedure of FIG. 8 according to an exemplary embodiment of the present invention.

FIG. 9 is a signaling diagram illustrating a handover procedure modified from the handover procedure of FIG. 8 according to an exemplary embodiment of the present invention.

The exemplary embodiment of FIG. 9 includes an option to that of the exemplary embodiment of FIG. 8. Unlike the exemplary embodiment of FIG. 8 in which the MME determines handover rejection, the exemplary embodiment of FIG. 9 is characterized in that the MME transmits the flag for inter-PLMN to CSG cell to the eNB in the initial UE Context Setup request message for installing the UE context according to the result transmitted by the HSS such that the eNB determines whether to initiate the handover to a target CSG cell belonging to another PLMN.

Referring to FIG. 9, in the Attach/TAU process at step 601, the MME1 53 forwards the flag received from the HSS 56 at step 601.*b* to the eNB1 52 at step 601.*c* such that, although the UE1 51, which may move close to the HeNB cell at step 603, reports to the HeNB cell at step 604, the eNB1 52 rejects handover if the flag is set to false and if the target cell is a CSG cell belonging to another PLMN, and initiates handover if the flag received from the MME1 53 is set to true and if the target cell is a CSG cell belonging to another PLMN at step 605. The procedure following step 605 is substantially identical with that of FIG. 8. That is, steps 606, 607, 608.*a* and 608.*b* are substantially identical with steps 506, 507, 508.*a* and 508.*b*.

In order to address the backward compatibility of the exemplary embodiments of FIGS. 6 to 9 with the legacy method in which an HSS transmits the allowed CSG list of the registered PLMN, if there is no additional information, i.e., if only the allowed CSG of the registered PLMN is transmitted, the MME determines that the inter-PLMN handover to the CSG cell is not supported and thus rejects the inter-PLMN handover.

Figure 10:
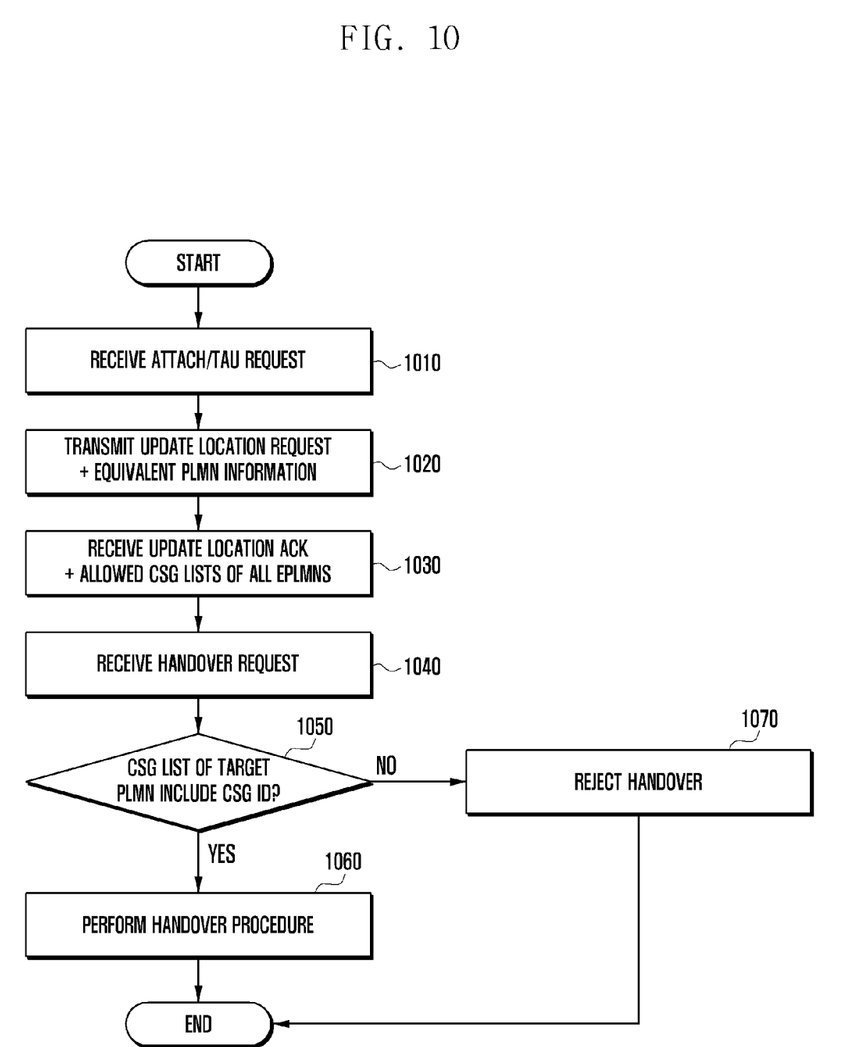
FIG. 10 is a flowchart illustrating a Mobility Management Entity (MME) procedure in a handover control method according to an exemplary embodiment of the present invention.

FIG. 10 is a flowchart illustrating an MME procedure in a handover control method according to an exemplary embodiment of the present invention.

Referring to FIG. 10, an MME receives an ATTACH or TAU request message from a UE at step 1010. The MME transmits an Update location request message to an HSS at step 1020. As above described, the Update location request message may include parameters of the PLMNs.

The MME receives an Update location ACK from the HHS at step 1030. In an exemplary implementation, the Update location ACK can include the allowed CSG lists of the equivalent PLMNs.

If a Handover request message is received from the eNB at step 1040, the MME determines whether, among the received allowed CSG lists, the list corresponding to the target PLMN includes the target CSG ID at step 1050. If the allowed CSG list of the target PLMN includes the target CSG ID, the MME continues the handover procedure in step 1060 and, otherwise, rejects the handover at step 1070.

Figure 11:
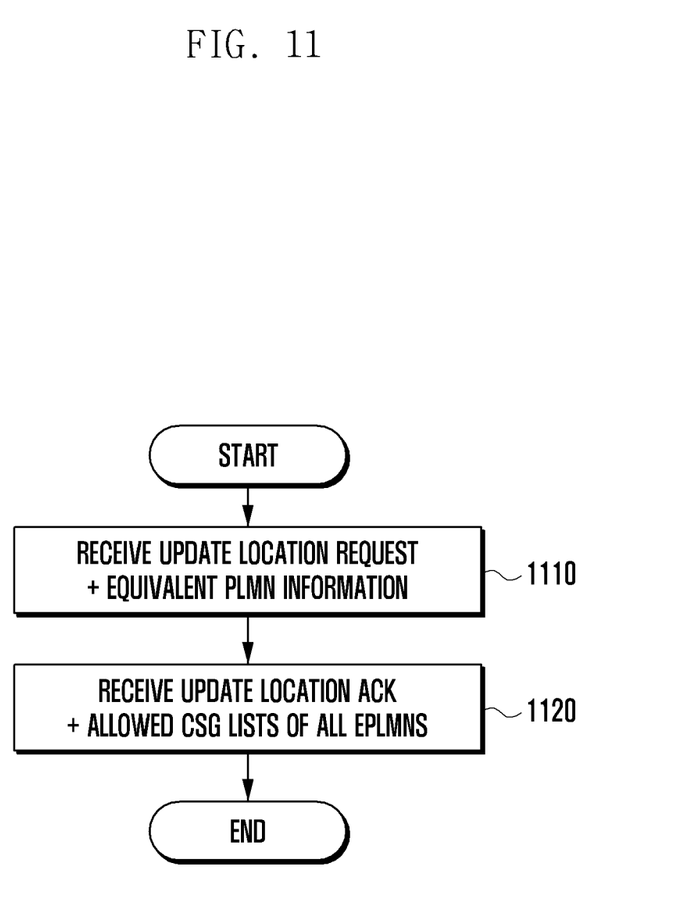
FIG. 11 is a flowchart illustrating a Home Subscriber Server (HSS) procedure in a handover control method according to an exemplary embodiment of the present invention.

FIG. 11 is a flowchart illustrating an HSS procedure in a handover control method according to an exemplary embodiment of the present invention.

Referring to FIG. 11, an HSS receives an Update location request message transmitted by the MME at step 1110. In an exemplary implementation, the Update location request message may include the parameters of the equivalent PLMNs.

The HSS transmits an Update location ACK message to the MME at step 1120. In an exemplary implementation, the Update location ACK message may include the allowed CSG lists of the equivalent PLMNs.

According to exemplary embodiments of the present invention, in the handover of a UE to an HeNB having CSG ID of a different PLMN, an MME receives subscription information in the UE's attach/tracking update procedure and makes a correct handover decision so as to prevent handover failure and improve successful handover probability.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for communication by a mobility management entity (MME), the method comprising:

receiving, from a base station, a first request message including an attach request message or a track area update request message;

transmitting, to a home subscriber server (HSS), a second request message including an equivalent public land mobile network (PLMN) list based on the first request message, if the MME supports an inter-PLMN handover to a closed subscriber group (CSG) cell in the equivalent PLMN list; and receiving, from the HSS, a response message in response to the second request message, the response message including CSG subscription information for the equivalent PLMN list.

2. The method of claim 1, wherein the equivalent PLMN list is a list of PLMNs considered as equivalent by a user equipment for one of cell selection, cell reselection and handover.

3. The method of claim 1, wherein the second request message comprises the equivalent PLMN list, if the MME supports the inter-PLMN handover based on subscription information of a target PLMN.

4. The method of claim 1, further comprising:
receiving a handover required message including at least one of a CSG identity (ID) of a target cell and target PLMN information from the base station; and
validating a CSG membership of a terminal in the target cell based on the CSG subscription information for the equivalent PLMN list.

5. The method of claim 4, wherein the validating of the CSG membership of the terminal in the target cell comprises rejecting, if the handover is not permitted based on the CSG subscription information for the equivalent PLMN list, the handover.

6. The method of claim 1, wherein the second request message is an update location request message and the response message is an update location acknowledgement message.

7. A method for communication by a home subscriber server (HSS), the method comprising:
receiving, from the mobility management entity (MME), a first request message including an equivalent public land mobile network (PLMN) list based on a second request message transmitted from a base station, if the MME supports an inter-PLMN handover to a closed subscriber group (CSG) cell in the equivalent PLMN list; and
transmitting, to the MME, a response message in response to the first request message, the response message including CSG subscription information for the equivalent PLMN list,
wherein the second request message includes an attach request message or a track area update request message.

8. The method of claim 7, wherein the equivalent PLMN list is a list of PLMNs considered as equivalent by a user equipment for one of cell selection, cell reselection and handover.

9. The method of claim 7, wherein the first request message comprises the equivalent PLMN list, if the MME supports the inter-PLMN handover based on subscription information of a target PLMN.

10. The method of claim 7, wherein the CSG subscription information for the equivalent PLMN list is used for validating a CSG membership of a terminal in a target cell if the MME receives a handover required message including at least one of a CSG identity (ID) of the target cell and target PLMN information from a base station.

11. The method of claim 10, wherein the handover is rejected, if the handover is not permitted based on the CSG subscription information for the equivalent PLMN list.

12. The method of claim 7, wherein the first request message is an update location request message and the response message is an update location acknowledgement message.

13. A mobility management entity (MME) for receiving and transmitting information, the MME comprising:
a transceiver configured to transmit and receive a signal; and
a controller configured to:
receive, from a base station, a first request message including an attach request message or a track area update request message,
transmit, to a home subscriber server (HSS), a second request message including an equivalent public land mobile network (PLMN) list based on the first request message, if the MME supports an inter-PLMN handover to a closed subscriber group (CSG) cell in the equivalent PLMN list, and
receive, from the HSS, a response message in response to the second request message, the response message including CSG subscription information for the equivalent PLMN list.

14. The MME of claim 13, wherein the equivalent PLMN list is a list of PLMNs considered as equivalent by a user equipment for one of cell selection, cell reselection and handover.

15. The MME of claim 13, wherein the second request message comprises the equivalent PLMN list, if the MME supports the inter-PLMN handover based on subscription information of a registered target PLMN.

16. The MME of claim 13, wherein the controller is further configured to:
receive a handover required message including at least one of a CSG identity (ID) of a target cell and target PLMN information from the base station, and
validate a CSG membership of a terminal in the target cell based on the CSG subscription information for the equivalent PLMN list.

17. The MME of claim 16, wherein the controller is further configured to reject the handover, if the handover is not permitted based on the CSG subscription information for the equivalent PLMN list.

18. The MME of claim 13, wherein the second request message is an update location request message and the response message is an update location acknowledgement message.

19. A home subscriber server (HSS) for transmitting and receiving information, the HSS comprising:
a transceiver configured to transmit and receive a signal; and
a controller configured to:
receive, from the mobility management entity (MME), a first request message including an equivalent public land mobile network (PLMN) list based on a second request message transmitted from a base station, if the MME supports an inter-PLMN handover to a closed subscriber group (CSG) cell in the equivalent PLMN list, and
transmit, to the MME, a response message in response to the first request message, the response message including CSG subscription information for the equivalent PLMN list,
wherein the second request message includes an attach request message or a track area update request message.

20. The HSS of claim 19, wherein the equivalent PLMN list is a list of PLMNs considered as equivalent by a user equipment for one of cell selection, cell reselection and handover.

21. The HSS of claim 19, wherein the first request message comprises the equivalent PLMN list, if the MME supports the inter-PLMN handover based on subscription information of a target PLMN.

22. The HSS of claim 19, wherein the CSG subscription information for the equivalent PLMN list is used for validating a CSG membership of a terminal in a target cell if the MME receives a handover required message including at least one of a CSG identity (ID) of the target cell and target PLMN information from a base station.

23. The HSS of claim 22, wherein the handover is rejected, if the handover is not permitted based on the CSG subscription information for the equivalent PLMN list.

24. The HSS of claim 19, wherein the first request message is an update location request message and the response message is an update location acknowledgement message.

* * * * *